US012235017B2

(12) United States Patent
Grobe et al.

(10) Patent No.: US 12,235,017 B2
(45) Date of Patent: Feb. 25, 2025

(54) BEARING COMPONENT FOR FLOW SENSOR, FLOW METERING UNIT AND DOMESTIC APPLIANCE

(71) Applicant: STIEBEL ELTRON GMBH & CO. KG, Holzminden (DE)

(72) Inventors: Michael Grobe, Hoexter (DE); Steffen Klie, Lobach (DE)

(73) Assignee: STIEBEL ELTRON GMBH & CO. KG, Holzminden (DE)

( * ) Notice: Subject to any disclaimer, the term of this patent is extended or adjusted under 35 U.S.C. 154(b) by 763 days.

(21) Appl. No.: 17/436,890

(22) PCT Filed: Feb. 27, 2020

(86) PCT No.: PCT/EP2020/055169
§ 371 (c)(1),
(2) Date: Sep. 7, 2021

(87) PCT Pub. No.: WO2020/178141
PCT Pub. Date: Sep. 10, 2020

(65) Prior Publication Data
US 2022/0163233 A1    May 26, 2022

(30) Foreign Application Priority Data
Mar. 7, 2019  (DE) .......................... 102019001529.0

(51) Int. Cl.
*F24H 1/10*   (2022.01)
*F24H 3/02*   (2022.01)
(Continued)

(52) U.S. Cl.
CPC ................. *F24H 1/10* (2013.01); *F24H 3/02* (2013.01); *F24H 9/2028* (2013.01);
(Continued)

(58) Field of Classification Search
CPC . F24H 1/10; F24H 3/02; F24H 9/2028; F24H 15/238; G01F 1/06; G01F 15/006; F24D 2220/044
See application file for complete search history.

(56) References Cited

U.S. PATENT DOCUMENTS

| 6,079,280 A * | 6/2000 | Miller ....................... G01F 1/10 |
| | | 416/223 R |
| 2011/0100138 A1 | 5/2011 | Hou |
| 2015/0135851 A1 | 5/2015 | Lauber et al. |

FOREIGN PATENT DOCUMENTS

| CN | 101490331 A | 7/2009 |
| CN | 207019612 U | 2/2018 |

(Continued)

*Primary Examiner* — Shawntina T Fuqua
(74) *Attorney, Agent, or Firm* — Brooks Kushman P.C.

(57) ABSTRACT

A flow sensor of a domestic appliance has an axle that is substantially perpendicular in the installed state to the flow direction of a fluid channel of the domestic appliance. The bearing component is designed as a single part and has at least two interconnected limbs, each limb having an axle mount for one end of the axle of the flow sensor, wherein the two axle mounts are mutually spaced apart in such a way that they correspond in a relaxed condition of the bearing component to an extension of the axle of the flow sensor. The two limbs are designed to be elastic such that the spacing between the axle mounts can be increased in order to insert the flow sensor between the axle mounts.

9 Claims, 10 Drawing Sheets

(51) Int. Cl.
  *F24H 9/20* (2022.01)
  *F24H 15/238* (2022.01)
  *G01F 1/06* (2006.01)
  *G01F 15/00* (2006.01)

(52) U.S. Cl.
  CPC ............ *F24H 15/238* (2022.01); *G01F 1/06* (2013.01); *G01F 15/006* (2013.01)

(56) References Cited

FOREIGN PATENT DOCUMENTS

| | | | | |
|---|---|---|---|---|
| CN | 108709320 | A | 10/2018 | |
| CN | 109084042 | A | 12/2018 | |
| DE | 29617294 | U1 | 2/1997 | |
| DE | 20005327 | U1 | 5/2000 | |
| DE | 10225722 | C1 | 12/2003 | |
| DE | 102008043613 | A1 | 5/2010 | |
| DE | 102012013344 | A1 | 1/2014 | |
| DE | 102012013347 | A1 | 1/2014 | |
| DE | 202013009831 | U1 | 3/2015 | |
| EP | 1596062 | A1 * | 11/2005 | ............. F03D 80/70 |
| EP | 2017585 | A1 | 1/2009 | |
| EP | 1067365 | B1 * | 1/2017 | ........... G01D 5/2412 |

\* cited by examiner

BEARING COMPONENT FOR FLOW SENSOR, FLOW METERING UNIT AND DOMESTIC APPLIANCE

CROSS-REFERENCE TO RELATED APPLICATIONS

This application is the U.S. National Phase of PCT Application No. PCT/EP2020/055169 filed on Feb. 27, 2020, which claims priority to German Patent Application No. 10 2019 001 529.0 filed on Mar. 7, 2019, the disclosures of which are hereby incorporated in their entirety by reference herein.

TECHNICAL FIELD

The present disclosure relates to a bearing for a flow sensor of a domestic appliance, to a flow metering unit of a domestic appliance, and to a domestic appliance.

BACKGROUND

In domestic appliances, such as continuous-flow heaters, to which liquid is supplied, it may be necessary to measure the amount of liquid flowing through the domestic appliance. This is typically done using a flow sensor.

DE 10 2008 043 613 A1 shows a domestic appliance with a liquid supply. A flow sensor is provided to measure the amount of liquid flowing through the domestic appliance. The flow sensor has an impeller that is provided in a housing. The housing is coupled to a liquid-conducting channel. The housing has a base member and a cover.

DE 200 05 327 U1 shows a continuous-flow heater with an impeller flow meter. An impeller is provided in a housing having a base member and a cover.

DE 20 2013 009 831 U1 shows a domestic appliance with an impeller flow meter and a closure unit on a cover.

SUMMARY

Flow sensors, in particular impellers, are exposed to high levels of stress over their service life. The impellers may be mounted in bearing shells designed for that purpose, which are integrally embodied with the liquid channel in which the flow sensor measures the flow rate.

The housings of the flow units of domestic appliances, e.g., continuous flow heaters, may be formed of fibre-reinforced materials such as fibreglass-reinforced plastics. In cases where the water quality is poor, such as water with a high chloride concentration, the rotating impellers are subject to increased wear and abrasion, which may result in reduced service life of the domestic appliance.

Disclosed herein are improved flow sensors that are less or not affected by the water quality.

In one or more embodiments, a bearing component of a flow sensor, e.g., of an impeller, of a domestic appliance, such as a continuous-flow heater, wherein the flow sensor has an axle that is substantially perpendicular in the installed state to the flow direction of a fluid channel of the domestic appliance. The bearing component is designed as a single part and has two interconnected limbs. The bearing component includes two oppositely disposed axle mounts, wherein the two axle mounts are mutually spaced apart in such a way that they correspond to the extension of the axle of the flow sensor in one condition of the bearing component. The two limbs are designed to be elastic, such that the spacing between the axle mounts can be increased in order to insert the flow sensor between the axle mounts.

The axle mount for one of the two ends of the axle of the flow sensor is attached to the one limb, and the other axle mount is attached oppositely to the other limb. In a relaxed condition of the bearing component, the limbs also correspond to an extension of the axle of the flow sensor.

The bearing component ensures that the flow sensor, e.g., the impeller, is not mounted directly in the housing of the domestic appliance, for example of the continuous-flow heater. The housing of the domestic appliance generally includes polyamides or similar materials that are fibre-reinforced and which therefore result in rapid abrasion of the flow sensor, for example in cases where the water quality is poor. Due to the poor water quality, the fibres are released from the material, thus resulting in strong abrasion of the flow sensor. By disposing the bearing component between the flow sensor and the housing of the domestic appliance, the flow sensor is mounted in the bearing component and not in the housing of the domestic appliance.

The integral design of the bearing component allows for straightforward assembly due to the limbs of the bearing component being elastic, thus allowing the impeller to be clamped between the limbs such that the flow sensor is prevented from falling out.

The two limbs are preferably connected at a first end and at an opposite second end, wherein the axle mounts are formed substantially in the middle between the first end and the second end in such a way that the distance between the axle mounts is increased when a compressing force is exerted between the first end and the second end.

The bearing component can be either open, for example in the shape of headphones, or closed, for example in the shape of a rhombus. In this embodiment, the two limbs are connected at a first end and at an opposite second end, i.e., they are embodied in the shape of a rhombus.

In this case, by compressing two opposite ends of the limbs together, the axle mounts are forced apart so that there is sufficient space for receiving the flow sensor in the space between the two limbs. By releasing the force applied to the ends of the limbs, the axle mounts return to their relaxed position, so that the flow sensor is securely mounted between the axle mounts. In contrast to the open embodiment, i.e., an embodiment in which the limbs are connected to one another at a first end only and extend from there in different directions to the axle mounts, mounting the flow sensor in the bearing component is simplified in this embodiment.

The bearing component may be formed symmetrically around the axis connecting the axle mounts. This prevents incorrect mounting, for example, by inserting the bearing component the wrong way round. It is then possible to insert it in the same way either way round.

In one or more example embodiments, a flow assembly for a domestic appliance includes a bearing component according to the first aspect described, and a flow sensor, e.g., an impeller, having an axle, wherein the axle of the flow sensor is received between the axle mounts of the bearing component.

The flow assembly can therefore be inserted into the housing of the domestic appliance in a single step. Due to the bearing component receiving the flow sensor securely between the axle mounts of the limbs, it is not possible for the flow sensor to fall out.

The material of the flow sensor may be the same as the material of the bearing component. Keeping the material of the bearing and the element mounted therein the same allows reliable and high-quality mounting. In this arrangement, the surface slip properties of the bearing are permanent and are not associated with rapid abrasion, as is the case when mounting is directly on the housing, for example.

At least one of the bearing component and the flow sensor may include polyketone. Polyketones are proved to be resistant to poor water qualities, for example water with high chlorine concentrations. Materials other than polyketone, for example, polyoxymethylene (POM), are also possible. In one or more embodiments, the use of fibres for reinforcing the materials in the bearing component and the flow sensor is avoided as these can increase abrasion and shorten the service life.

Also disclosed is a domestic appliance, such as a continuous-flow heater. The domestic appliance has a housing with a base member, a cover and a channel. The domestic appliance also includes a flow assembly according to this disclosure. The base member and/or the cover has a receiving space for receiving the bearing component in such a way that the flow sensor received in the bearing component protrudes at least partly into the channel when the bearing component is received in the receiving space.

The position of the bearing component is fixed relative to the channel by the receiving space. Whereas the position of the bearing component is fixed in this manner, the flow sensor mounted in the bearing component can rotate with little friction about the axle and measure the flow rate through the channel.

The manufacturing concept of domestic appliances hitherto needs to be adapted only minimally, and the steps of inserting the flow sensor into the housing and closing the housing with the cover remain the same. Only the sensor component to be used is changed, namely in such a way that it already includes a bearing and is not mounted exclusively in the housing.

The cover may designed to fix in place the bearing component that is received in the receiving space.

The housing may include polyamide. For example, the housing includes fibre-reinforced polyamide. Polyamide and fibre-reinforced polyamide are durable and heat-resistant, and therefore, suitable for domestic appliances such as continuous-flow heaters.

The distance between the two oppositely disposed axle mounts for the two ends of the flow sensor axle may correspond, in a relaxed condition of the bearing component, or also in a tensed condition of the bearing component, to an extension of the axle of the flow sensor.

In a relaxed condition, the bearing component is advantageously prepared to receive the axle, wherein the bearing component is then inserted in an untensed condition into the receiving space after the axle has been mounted.

Alternatively, the bearing component remains slightly tensed even when the axle is in the mounted condition, and is inserted in a tensed condition into the receiving space.

Once inserted in the receiving space, the bearing component remains in the at least slightly pretensioned condition, or the pretensioned condition is removed by insertion into the receiving space, in particular with the bearing component latching into the receiving space.

In an embodiment of the invention, the bearing component remains in a tensed or relaxed condition in the receiving space, with the axle remaining axially unstressed in the bearing component to a large extent. The spacing between the axle mounts is at least greater than or equal to the length of the axle, with the result that the axle is mounted in an axially unstressed manner to a large extent, and advantageously without axial force being exerted on the axle mounts.

BRIEF DESCRIPTION OF THE DRAWINGS

Further advantages and embodiments shall now be described with reference to the attached Figures, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
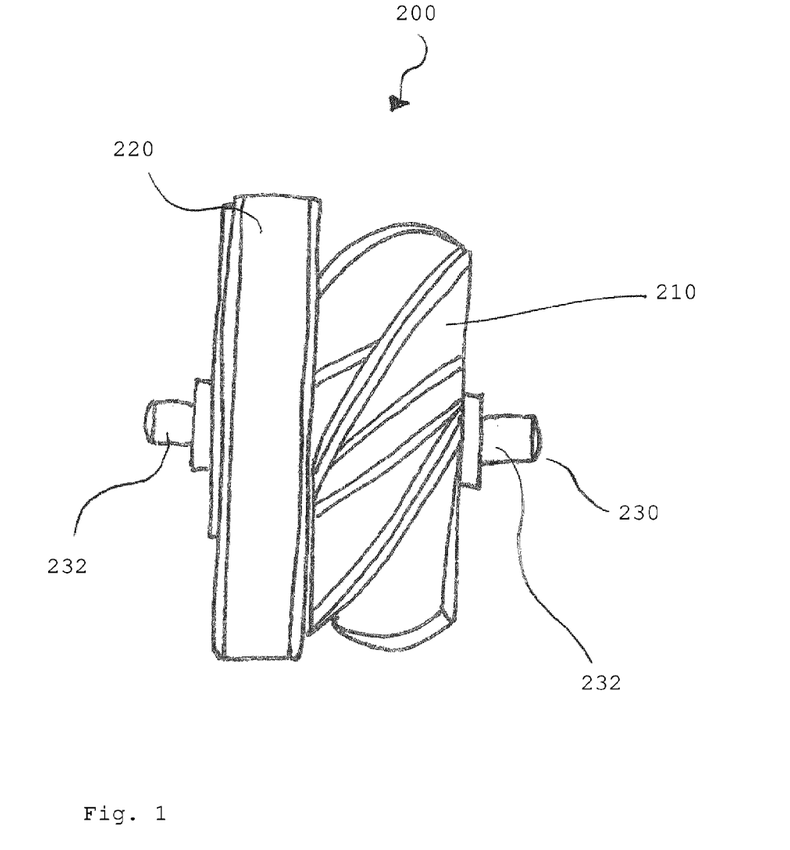
FIG. 1 shows a flow sensor in schematic form and by way of example.

FIG. 1 shows, in schematic form and by way of example, a flow sensor 200 in the form of an impeller used to measure the flow rate through a continuous-flow heater, for example. In this example, flow sensor 200 has vanes 210 and a magnetic element 220. Flow sensor 200 rotates by means of vanes 210 about an axle 230. On either side of axle 230, flow sensor 200 has journals 232 that until now were mounted directly in the housing of a domestic appliance.

Figure 2:
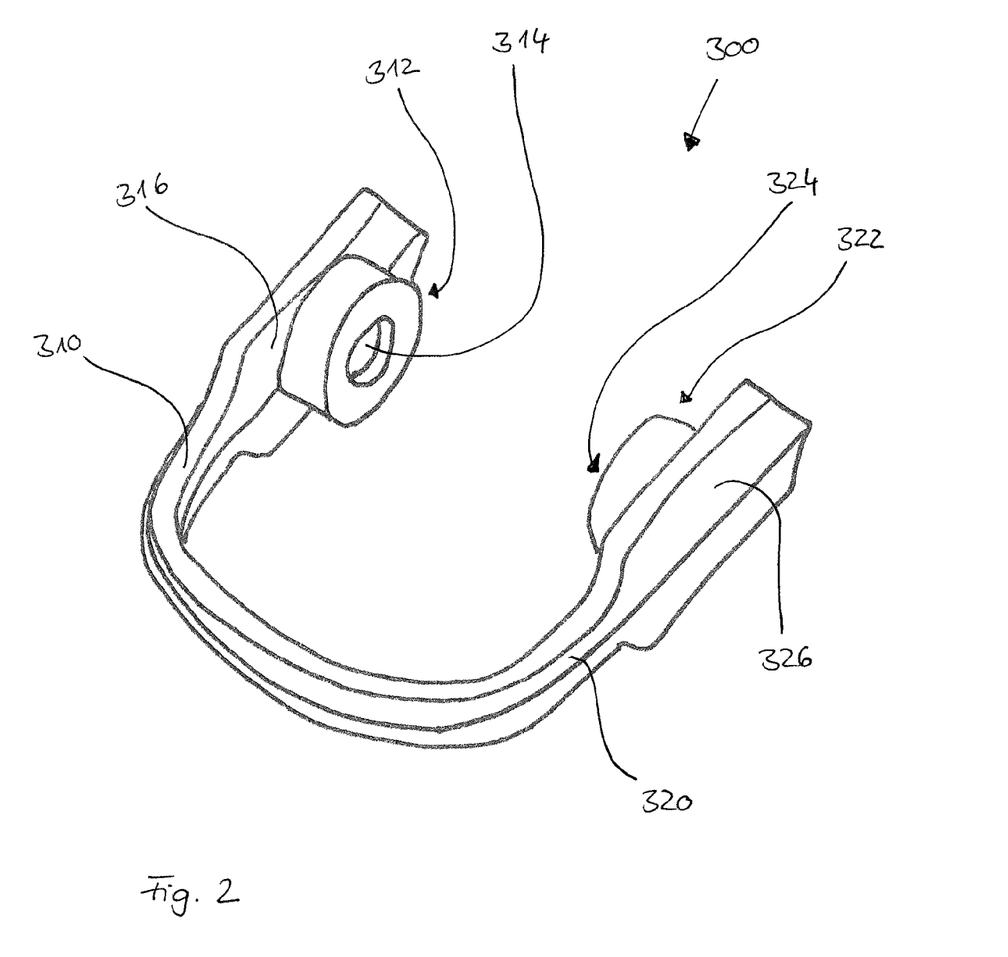
FIG. 2 shows a bearing component according to the invention, in schematic form and by way of example.

FIG. 2 shows, in schematic form and by way of example, a bearing component 300 for mounting a flow sensor 200 of the kind shown in FIG. 1. Bearing component 300 has two limbs 310 and 320, at the end of each there is an axle mount 312, 322.

Each axle mount 312, 322 has a recess 314, 324 in which the respective journals 232 of flow sensor 200 are received. In order to mount flow sensor 200 in bearing component 300, limbs 310, 320 are forced apart in such a way that the spacing between axle mounts 312 and 322 is increased. Flow sensor 200 can then be inserted between axle mounts 312, 322. After the limbs are released, bearing component 300 returns to its initial position, so that flow sensor 200 is securely received in bearing component 300.

In this example, for secure fixing inside the housing of the domestic appliance, bearing component 300 also has two optional fixing collars 316, 326 that match the housing and which cannot be used for other variants of the housing, or only if designed differently.

In this embodiment, bearing component 300 is made of a polyketone and as a single part. Flow sensor 200 is similarly made of a polyketone. Keeping the material of the flow sensor 200 and the bearing component 300 the same ensures that the surface slip properties of the axle mount and the flow sensor 200 are permanent. In particular, the materials are preferably not fibre-reinforced, so that any abrasion in chlorinated waters is reduced.

Figure 3:
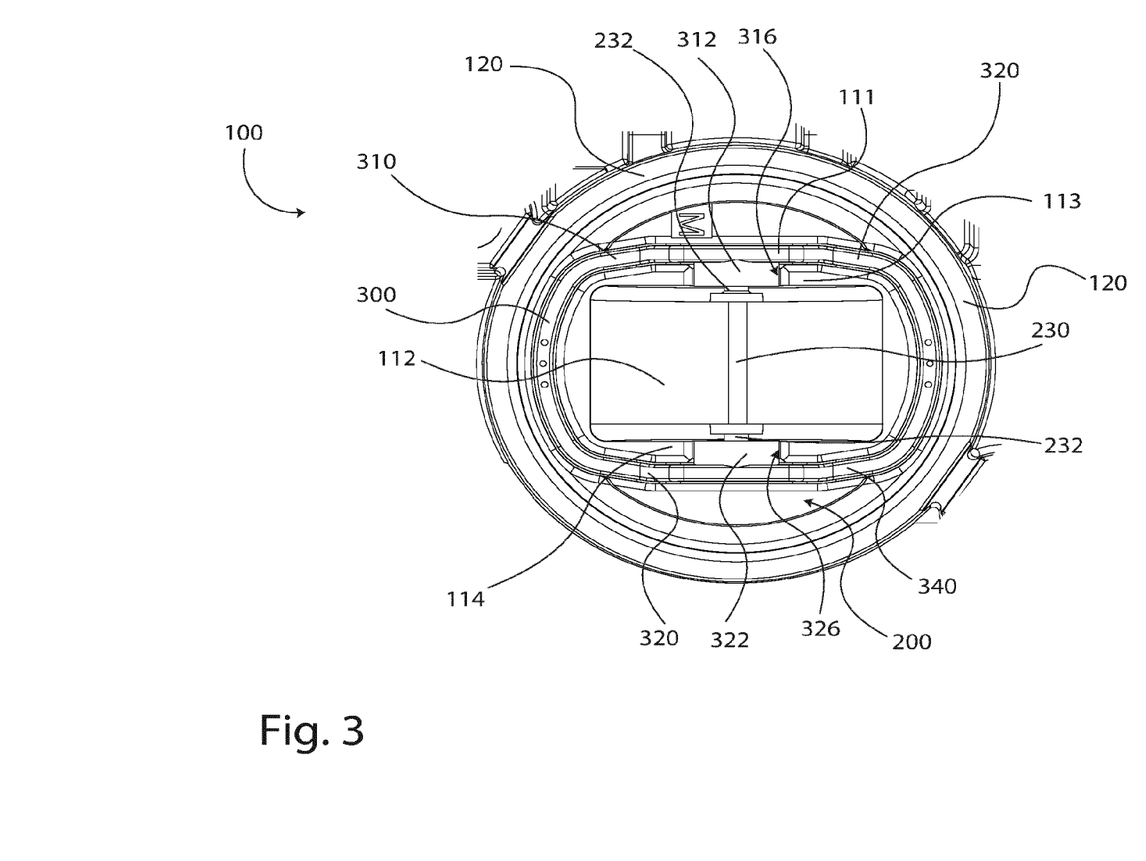
FIG. 3 shows, in schematic form and by way of example, the bearing component according to the invention inserted in a housing of a domestic appliance.

FIG. 3 shows, in schematic form and by way of example, the flow assembly including a bearing component 300 and a flow sensor 200, inserted in a domestic appliance 1.

Domestic appliance 1 has a housing 100 with a base member 120. An opening 112 provides access to a fluid channel for insertion of the flow assembly therein. Opening 112 is closed by a cover (not shown). For illustrative purposes, only axle 230 of flow sensor 200 is shown, which extends between the axle mounts of bearing component 300.

It can be seen that only bearing component 300, which does not rotate, is in contact with housing 100. Axle 230, in contrast, is mounted exclusively in bearing component 300 and may therefore be rotated with little friction. In this embodiment, limbs 310, 320 are inserted downwards into the plane of the drawing into opening 112. In other embodiments, a horizontal layout of bearing component 300, i.e., in the plane of the drawing, is also possible.

Bearing component 300 is fixed in its final position by fitting the cover. Alternatively, it is also possible to mount the flow assembly in the cover before the latter is fitted to close opening 112.

Figure 4:
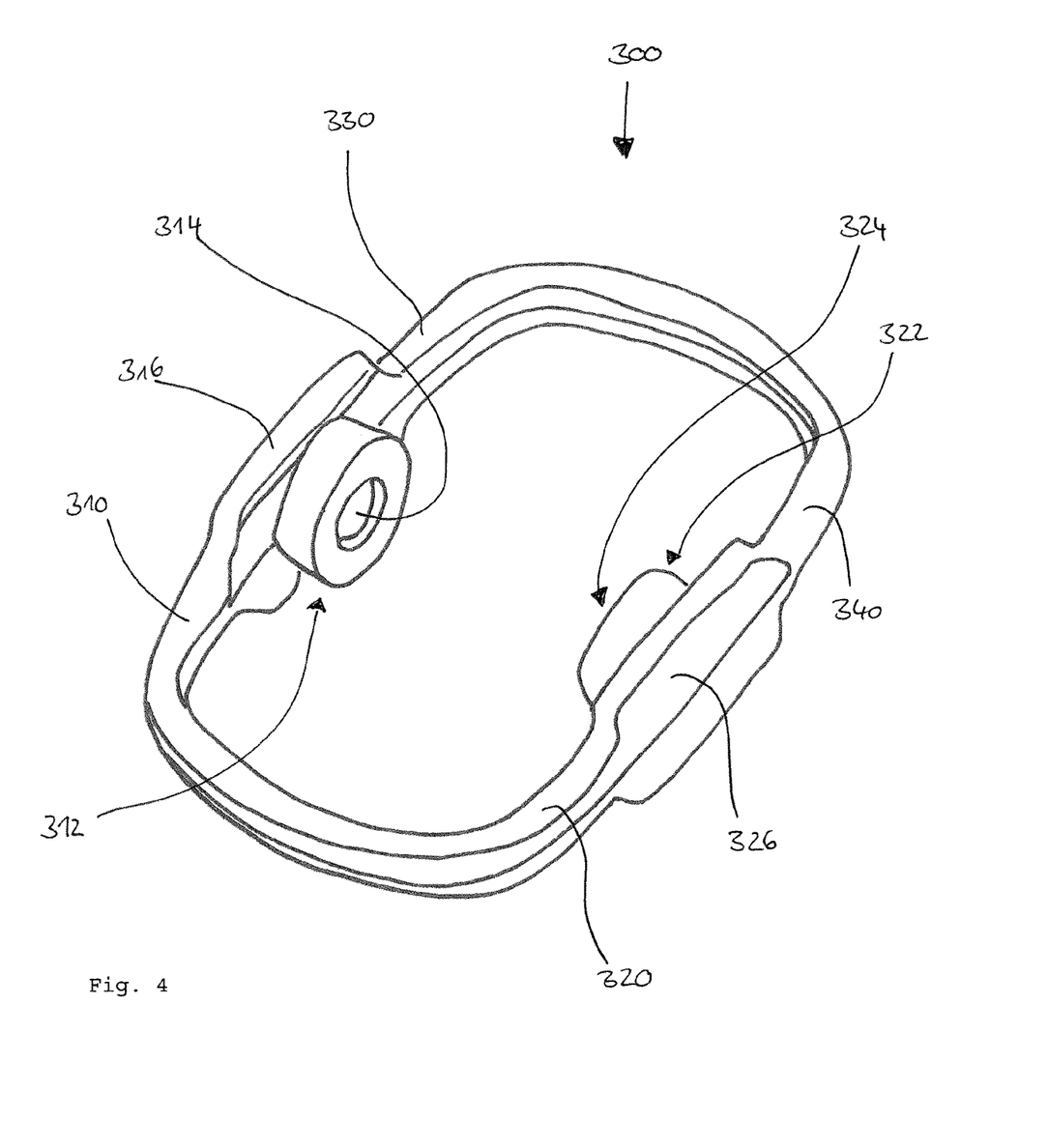
FIG. 4 shows a bearing component with limbs on either side.
Figure 5:
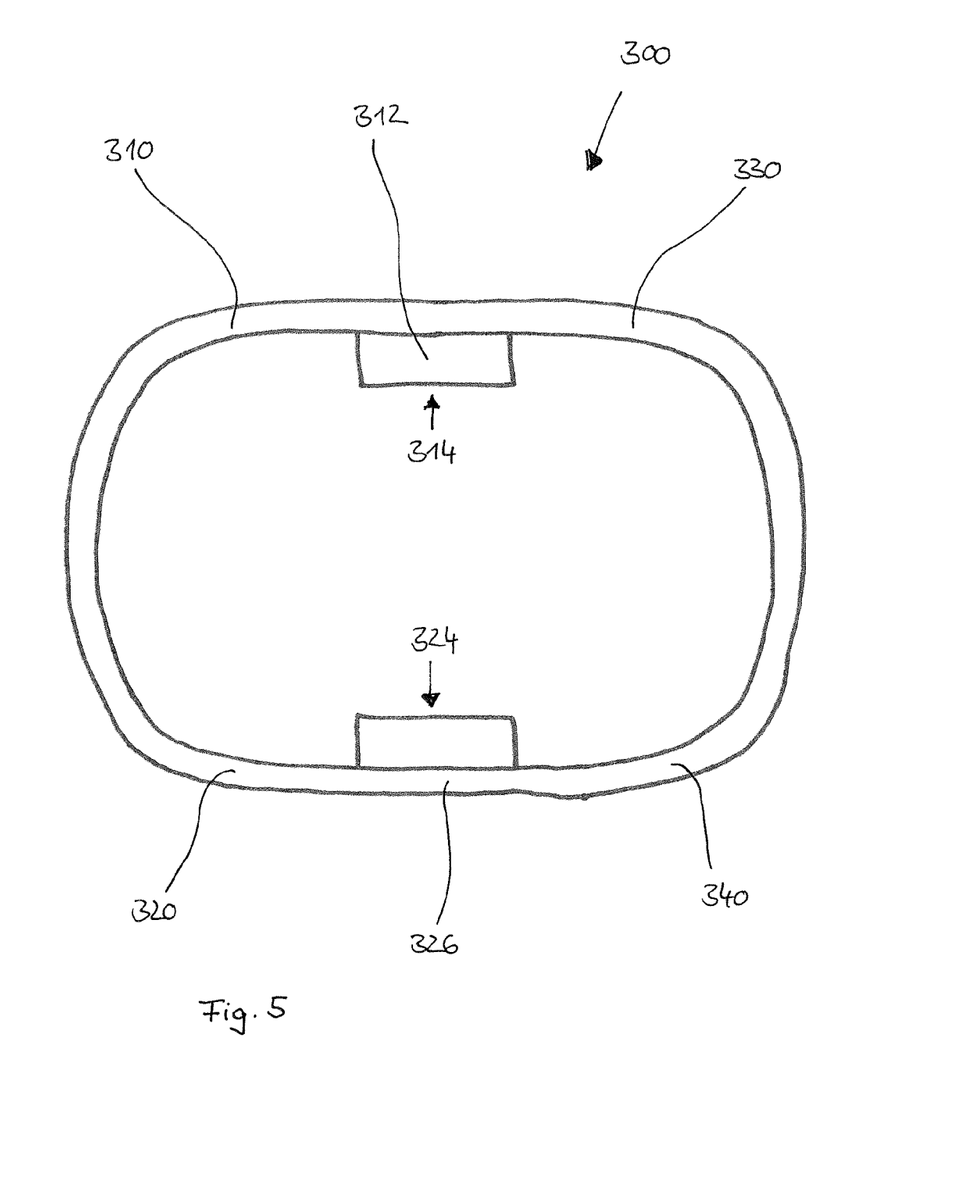
FIG. 5 shows a top view of a bearing component with limbs on either side.

FIGS. 4 and 5 show a bearing component 300 that has four limbs 310, 320, 330, 340. Recesses 314, 324 for mounting flow sensor 200 are each provided on two limbs. This results in a kind of closed ring of connected limbs 310, 320, 330, 340, on which the optional fixing collars 316, 326 are formed.

Limbs 310, 320, 330, 340 are designed to be elastic or flexible, so that they can be pressed apart in an assembly procedure, in particular at recesses 314, 324, so that flow sensor 200 fits between them and can be inserted into bearing component 300. When flow sensor 200 has been inserted into recesses 314, 324, limbs 310, 320, 330, 340 spring back again and flow sensor 200 is rotatably mounted in recesses 314, 324. Bearing component 300 with flow sensor 200 installed can then be inserted into a receiving space 111 in the base member 100 of the continuous-flow heater. By the cover, bearing body 300 is held in base member 100 and opening 112 is closed water-tightly, so that flow sensor 200 is mounted at least partially in the water channel of the domestic appliance, e.g., a continuous-flow heater.

Figure 6:
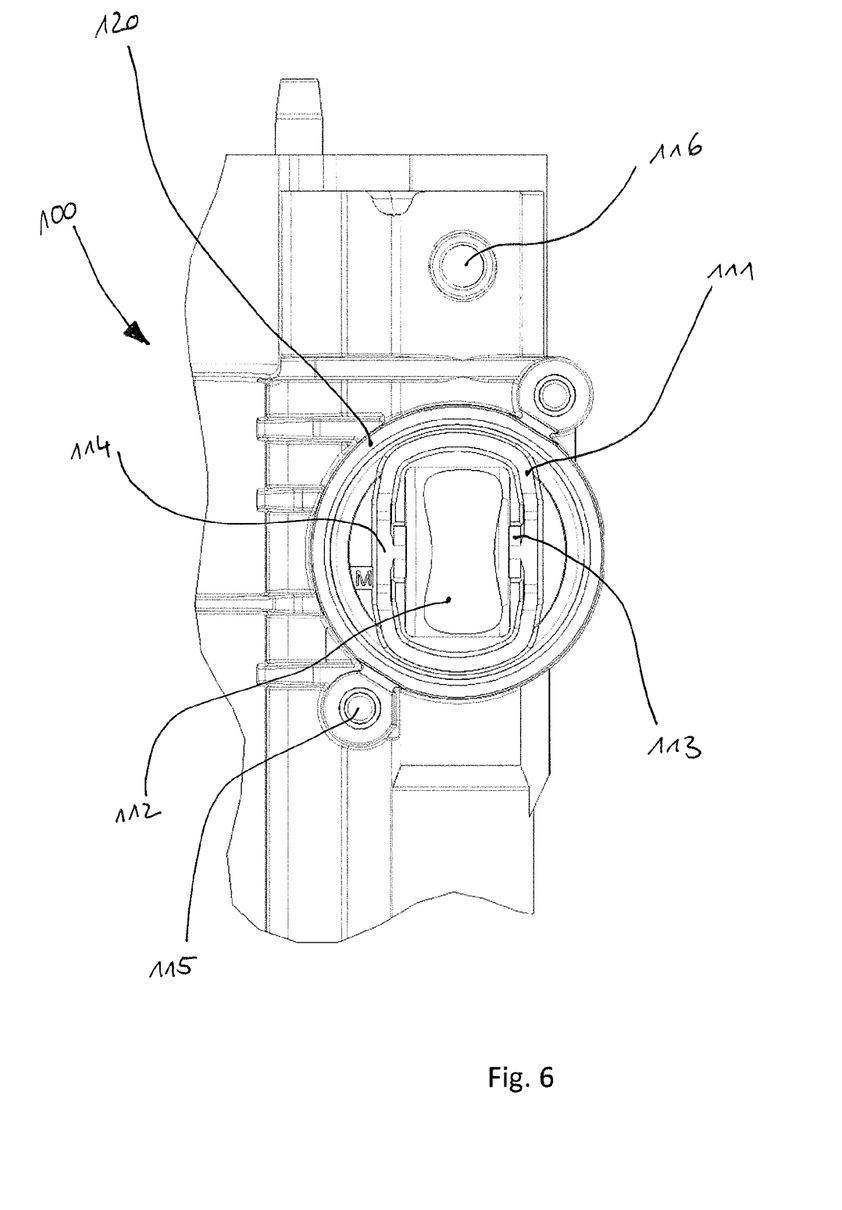
FIG. 6 shows a base member with a receiving space for a bearing component.
Figure 7:
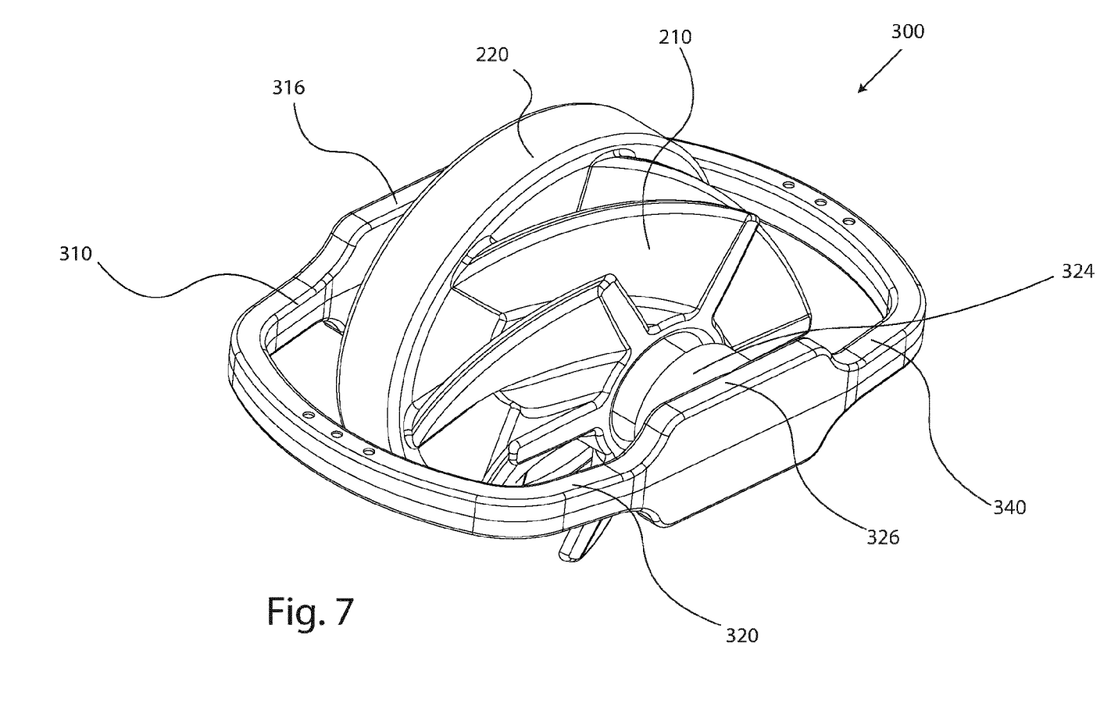
Figure 8:
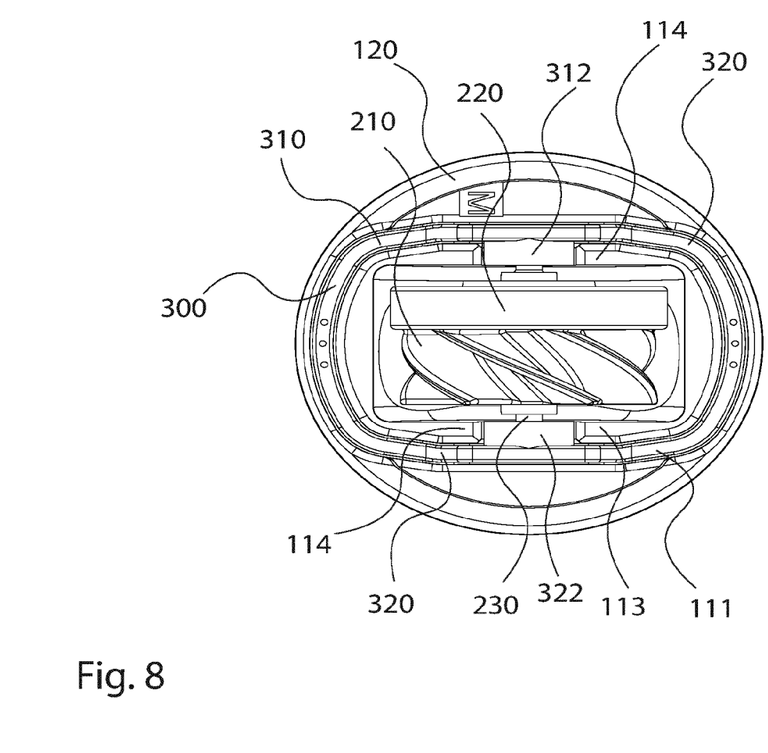
Figure 9:
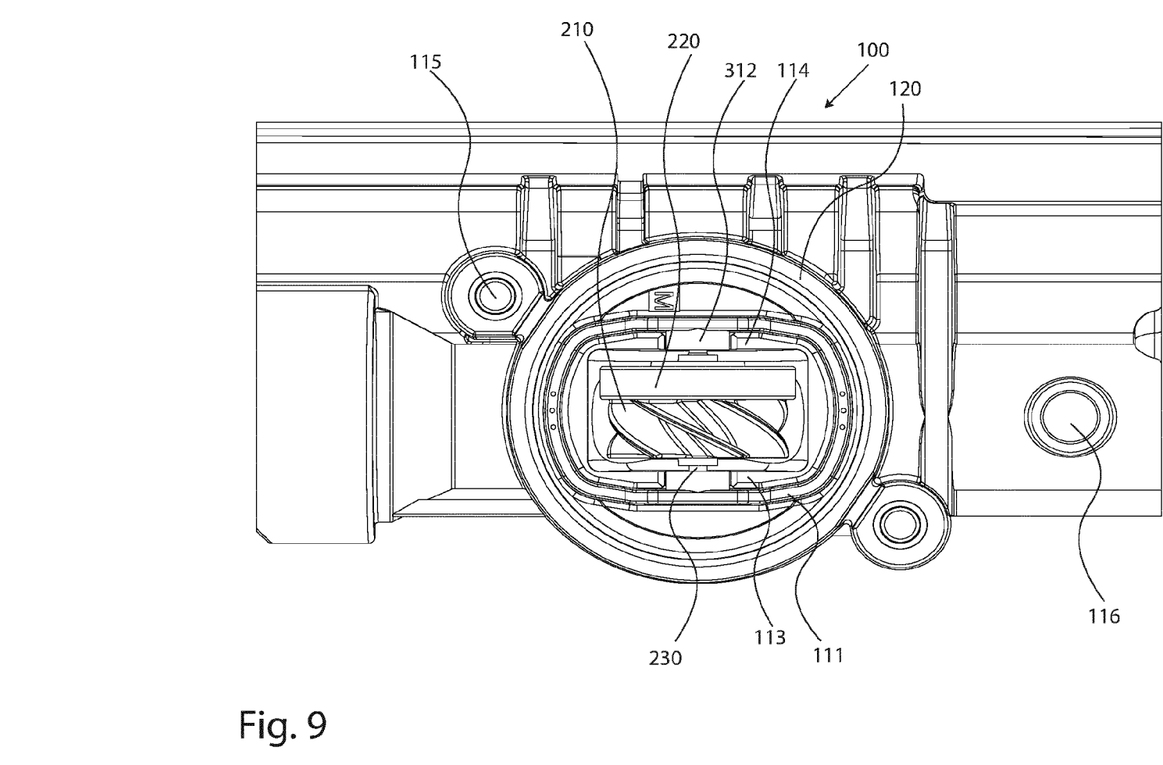
Figure 10:
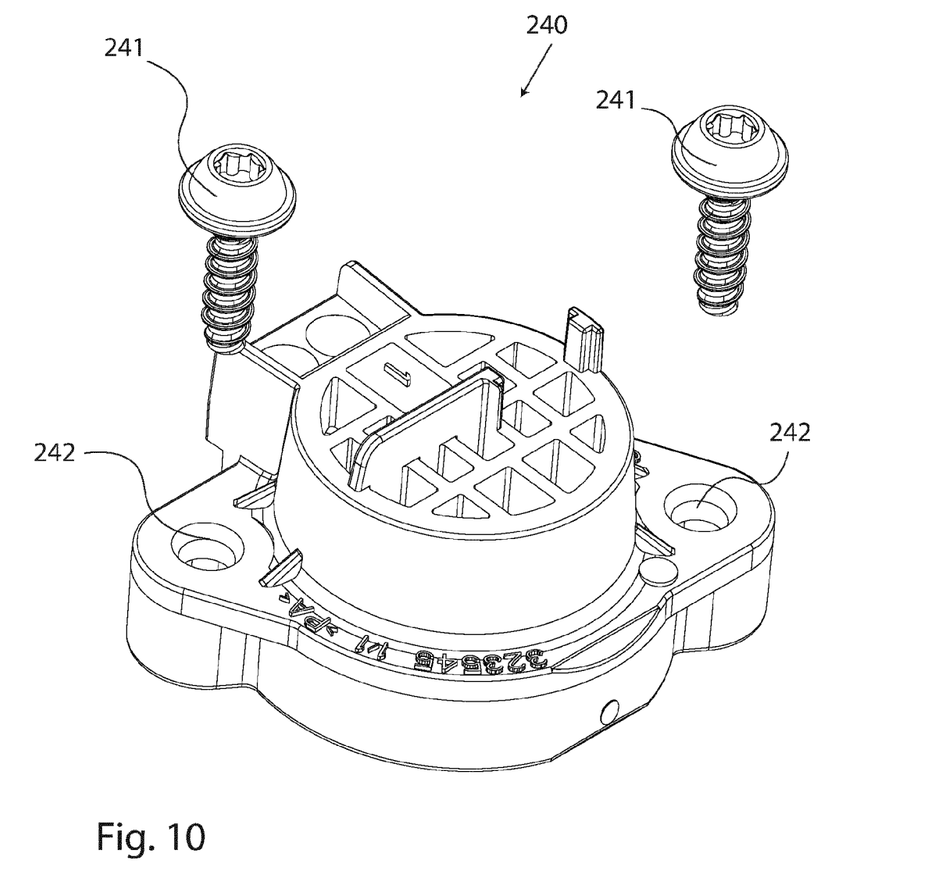

FIG. 6 shows a receiving space 111 for bearing component 300. A receiving space 111 is arranged around opening 112 and has a space 113, 114 for fixing collars 316, 326. Fastening devices 115, 116 are used to fasten the cover, not shown, to base member 120.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A bearing component of a flow sensor of a domestic appliance, the flow sensor having an axle that is substantially perpendicular in an installed state to a flow direction of a fluid channel of the domestic appliance, the bearing component comprising:
at least two interconnected limbs that are integrally formed as a single part; and
two oppositely disposed axle mounts that are mutually spaced apart in such a way that they correspond to an extension of the axle of the flow sensor in one condition of the bearing component;
wherein the two limbs are designed to be elastic such that spacing between the axle mounts can be increased in order to insert the flow sensor between the axle mounts,
wherein one of the axle mounts is attached to one of the limbs and the other of the axles mounts is attached oppositely to the other of the limbs, and wherein the limbs correspond in a relaxed condition of the bearing component to an extension of the axle of the flow sensor,
wherein the two limbs are connected at a first end and at an opposite second end, wherein the axle mounts are formed substantially in a middle between the first end and the second end in such a way that the spacing between the axle mounts is increased when a compressing force is exerted between the first end and the second end.

2. A bearing component of a flow sensor of a domestic appliance, the flow sensor having an axle that is substantially perpendicular in an installed state to a flow direction of a fluid channel of the domestic appliance, the bearing component comprising:
at least two interconnected limbs that are integrally formed as a single part; and
two oppositely disposed axle mounts that are mutually spaced apart in such a way that they correspond to an extension of the axle of the flow sensor in one condition of the bearing component;
wherein the two limbs are designed to be elastic such that spacing between the axle mounts can be increased in order to insert the flow sensor between the axle mounts, wherein the bearing component is formed symmetrically around an axis connecting the axle mounts.

3. A flow assembly for a domestic appliance comprising:
a housing having a base member, a cover, and a channel;
a flow sensor having an impeller supported on an axle; and
a bearing component including a pair of opposing axle mounts and a pair of interconnected limbs each connected to one of the axle mounts, wherein the limbs and the axle mounts are integrally formed as a single piece, and wherein the axle is received between the axle mounts, and the limbs are flexible allowing a distance between the axle mounts to be increased from a resting distance in which the axle is supported in the axle mounts and an extended distance that is longer than the axle, wherein
the base member or the cover has a receiving space for receiving the bearing component in such a way that the flow sensor received in the bearing component protrudes at least partly into the channel when the bearing component is received in the receiving space, and
a material of the flow sensor and the bearing component is the same.

4. The flow assembly according to claim 3, wherein at least one of the bearing component and the flow sensor includes polyketone.

5. A domestic appliance comprising:
a housing having a base member, a cover, and a channel;
a flow sensor including an impeller supported on an axle; and
a bearing component including a pair of opposing axle mounts and a pair of interconnected limbs each connected to one of the axle mounts, wherein the limbs and the axle mounts are integrally formed as a single piece, and wherein the axle is received between the axle mounts, and the limbs are flexible allowing a distance between the axle mounts to be increased from a resting distance in which the axle is supported in the axle mounts and an extended distance that is longer than the axle; wherein the base member or the cover has a receiving space for receiving the bearing component in such a way that the flow sensor received in the bearing component protrudes at least partly into the channel when the bearing component is received in the receiving space, and the bearing component further comprising a second pair of interconnected limbs each connected to one of the axle mounts.

6. The domestic appliance according to claim 5, wherein the cover is designed to fix in place the bearing component received in the receiving space.

7. The domestic appliance according to claim 5, wherein the housing includes a polyamide.

8. The domestic appliance according to claim 5, wherein the housing includes a fibre-reinforced polyamide.

9. A domestic appliance comprising:

a housing having a base member, a cover, and a channel;

a flow sensor including an impeller supported on an axle; and a bearing component including a pair of opposing axle mounts and a pair of interconnected limbs each connected to one of the axle mounts, wherein the limbs and the axle mounts are integrally formed as a single piece, and wherein the axle is received between the axle mounts, and the limbs are flexible allowing a distance between the axle mounts to be increased from a resting distance in which the axle is supported in the axle mounts and an extended distance that is longer than the axle;

wherein the base member or the cover has a receiving space for receiving the bearing component in such a way that the flow sensor received in the bearing component protrudes at least partly into the channel when the bearing component is received in the receiving space, wherein each of the axle mounts defines a recess configured to receive an end of the axle.

* * * * *